Patented July 29, 1952

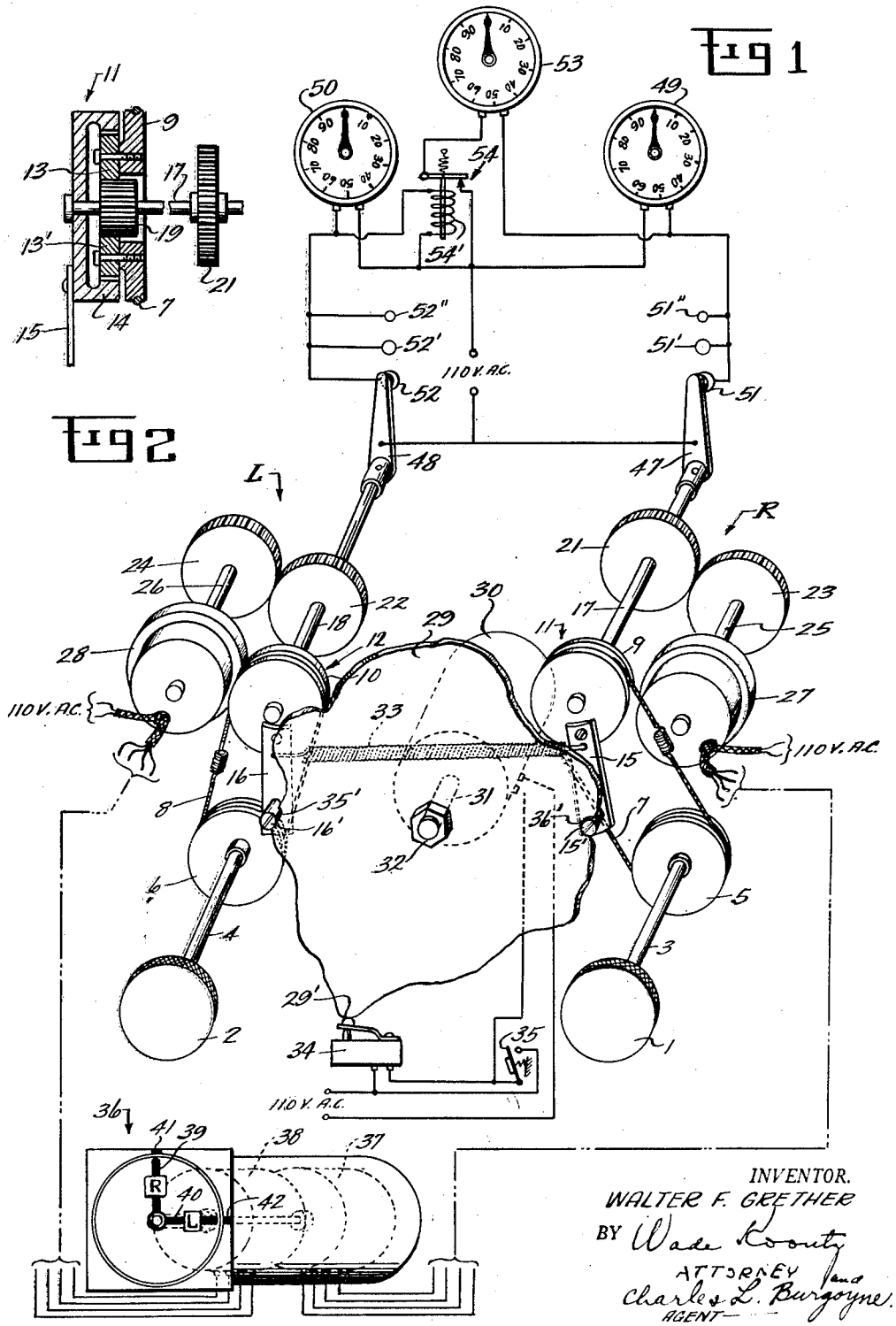

2,604,706

UNITED STATES PATENT OFFICE 2,604,706

APPARATUS FOR TESTING THE COORDINATION OF AVIATORS

Walter F. Grether, Dayton, Ohio

Application December 23, 1949, Serial No. 134,798

1 Claim. (Cl. 35—12)

(Granted under the act of March 3, 1883, as amended April 30, 1928; 370 O. G. 757)

The invention described herein may be manufactured and used by or for the United States Government for governmental purposes without payment to me of any royalty thereon.

The present invention relates to an apparatus for testing the muscular coordination of aviators, aviation students, machine operators and other persons.

The primary object of the invention is to provide an apparatus to measure or evaluate the degree of skill exhibited by a person attempting to apply a motion neutralizing force to a mechanical system to maintain a movable member in a fixed reference position in spite of motion producing means which tends to displace the movable member in an irregular manner not under control by the person being tested.

A further object of the invention is to provide an apparatus for testing the muscular coordination of a person attempting by simultaneous manipulation of right-hand and left-hand manual controls to maintain two adjacent movable indicator members in predetermined positions in spite of motion producing means which tend to displace the movable members in diverse and irregular sequences during the test.

Another object of the invention is to provide an apparatus to measure the aptitude of a person attempting to apply a motion to one part of a differential mechanism through a manual control member such that another motion not under control of the person and applied to another part of the differential will be neutralized, with the result that an output motion of the differential will be reduced to a minimum and an indicator member showing the extent of such output motion will be as nearly stationary as possible.

Another object of the invention is to provide an apparatus to measure the aptitude of a person attempting by simultaneous manipulation of right-hand and left-hand manual controls to maintain two adjacent movable indicator members in predetermined positions in spite of motion producing devices or mechanisms which tend to displace the movable members in an irregular manner and to provide indicator actuating members which will respond to being maintained in predetermined positions by actuating a pair of similar cumulative indicators to show for what portion of the test run the indicator actuating members are maintained in the predetermined positions aforesaid and to further provide a combined score indicating means to show for what portion of the test run the indicator actuating members are simultaneously maintained in the predetermined positions aforesaid.

Another object of the invention is to provide an apparatus to measure the coordinative ability of a person attempting to maintain two coaxial indicating pointers in predetermined angular relation in spite of mechanism not under control by the person which tends to displace the indicating pointers, whereby the measurement obtained will show to some extent the inherent ability of the person to successfully maneuver an airplane under instrument control thereof using a conventional flight instrument also including two coaxial indicating pointers normally maintained in a predetermined angular relation.

The above and other objects of the invention will become apparent upon reading the following detailed description of the invention in conjunction with the accompanying drawing, in which:

Fig. 1 is a schematic diagram of the present coordination tester and showing most of the mechanical components in perspective.

Fig. 2 is a transverse cross sectional view of the differential mechanism included in each of the right and left control systems of the tester.

The present application for patent forms a continuation-in-part of my abandoned application Serial No. 774,729, filed on September 18, 1947.

Considering now the general arrangement and electrical connections of the present testing apparatus reference is made to Fig. 1. The manually controlled portion of the apparatus as seen in perspective includes a right-hand system R and a left-hand system L each of similar construction and under control of a right-hand knob 1 and left-hand knob 2. The knobs intended for manipulation by the right hand and left hand of a test subject preferably seated in front of the apparatus and facing the outer ends of the knobs. The knobs 1 and 2 are rigidly connected to control shafts 3 and 4 which are in turn rigidly connected to pulleys or sheaves 5 and 6, and the latter are adapted to drive spring-tensioned belts 7 and 8 passing around sheaves 9 and 10. The latter sheaves are elements in differential mechanisms 11 and 12, as shown in detail in Fig. 2.

The differential device 11 of Fig. 2 includes the sheave 9 forming a carrier for the planet gears 13 and 13' meshing with an internal gear 14 having an arm 15 rigidly secured thereon. As seen in Fig. 1 the control arm 15 includes a cam follower 15' at the free end, preferably carrying a roller so as to reduce the frictional contact with the cam plate to a minimum. The left-hand mechanism is the same as that on the right and includes an arm 16 having a cam follower 16' thereon. In the differential of Fig. 2 it will be noted that the output shaft 17, having a left-hand counterpart 18, is journaled in the member 14 centrally thereof and has fixed thereon a sun gear 19 in constant mesh with the planet gears 13 and 13'. The shaft 17 further connects rigidly with a gear wheel 21, having a left-hand counterpart 22, and the wheel 21 drives another gear wheel 23, having a left-hand counterpart 24. The wheels 23 and 24 are rigidly connected to the synchro unit shafts 25 and 26 respectively, these shafts extending into driving relation with respect to the right-hand and left-hand signal-producing synchros 27 and 28 which may also be called synchro generators.

The differential-carried arms 15 and 16 are actuated by a cam plate 29 driven at a constant angular velocity by means of an electrical motor 30, the shaft 31 of which extends through the cam plate and is rigidly secured thereto by a nut 32. The cam actuated arms 15 and 16 are connected by a tension coil spring 33 so as to be held in constantly following engagement with the contoured edge of the cam plate. A high point 29' on the cam plate is adapted to contact a microswitch 34 at the end of each revolution of the cam shaft 31 to open the motor circuit and thus stop the drive motor 30, with the cam plate in the position shown. This shut-off point will also be indicated by a pair of notches 35' and 36' on the cam edge which come opposite the cam followers 15' and 16' at the same time the high point 29' strikes the microswitch 34. Once the circuit to motor 30 is broken by opening the power circuit including the switch 34, the motor 30 can best be started again by closing the power circuit manually by use of the manual start switch 35 in parallel with the microswitch 34. The switch 35 is spring returned to "off" position as soon as the motor 30 is started, since now the switch 34 becomes closed again as the high point 29' of cam plate 29 moves off the pressure element of microswitch 34. The cam 29 will now turn through one complete revolution without further attention until the cam point 29' again contacts the microswitch actuator to again break the circuit to cam drive motor 30. The direction of rotation of motor 30 is of no importance since the apparatus will function equally as well with a clockwise or counterclockwise cam rotation.

The signals from the synchro generators 27 and 28 are fed by suitable cables to an indicator unit 36 including a pair of coaxial synchro receivers 37 and 38 electrically connected to the generators 27 and 28 respectively. The synchro receiver 37 has a shaft extending through the synchro unit 38 and adapted to drive the right-hand indicator element 39, while a shaft of the synchro receiver 38 is connected to the other or left-hand indicator element 40. The front face plate of the indicator unit 36 carries fixed indicia or reference markers 41 and 42, opposite which the pointers or indicator elements 39 and 40 are supposed to be held by expert manipulation of the manual control knobs 1 and 2 respectively. The position selected for the fixed reference marks 41 and 42 is of course arbitrary and other locations therefor may be selected as desired. As indicated in the objects of the invention the particular angular relation of the pointers 39 and 40 corresponding to that found on a particular flight instrument used on aircraft and sometimes known as a cross-pointer indicator. While it is preferred in most installations to use the remote control synchro combinations for effecting indicator operation, it should be understood that the same effect may be had by mechanically connecting pointers to the test output shafts 17 and 18 to follow the extent of variation from the desired steady or reference positions. However it is understood that the indicator unit 36 will always be visible to the person under test, as well as to instructors conducting such tests.

The indicator unit 36 gives an instantaneous indication of the coordination ability of a subject under test but it is further desirable to have a cumulative scoring for each test run over the time required for one complete revolution of the master control cam 29. With this desirable scoring in view, there is provided a pair of scoring control arms 47 and 48 rigidly mounted on the test output shafts 17 and 18 and these arms being made of metal are adapted to complete separate circuits from a source of alternating current to a pair of indicators 49 and 50 through contacts 51 and 52 respectively. Other contacts 51' and 51'' above contact 51 and contacts 52' and 52'' above contact 52 are progressively smaller and by substitution of longer contact arms for the arms 47 and 48 the scoring on indicators 49 and 50 is thus made more difficult, since actuation of the indicators occurs only when the circuits through the contact arms and contacts are completed. Each of the indicators 49 and 50 is just simply a synchronous motor geared by reduction gearing to a hand or pointer and operating the pointer at the same angular velocity as the master cam 29. The face of each indicator is marked off from zero to one hundred so that the scoring can be read directly at the point where the pointer finally stops after one revolution of cam 29. If the person being tested is skilled enough to keep the indicator circuits closed for the full extent of the cam revolution, then the indicator pointers will complete a full revolution in the same time that the cam 29 completes a full revolution and the score on the indicators 49 and 50 will be 100. At any time during the test when either of the indicator circuits are open the corresponding indicator motor will be stopped and the pointer connected thereto will not rotate. Thus even though the arms 47 and 48 are only on the contacts 51 and 52 for several intervals during the test run, the motors in the cumulative scoring indicator units 49 and 50 will rotate during each interval and cause the connected pointers to gradually build up cumulative scores on the indicators.

Since the right-hand and left-hand scoring circuits will usually not be closed at exactly the same time and for the same concurrent periods of time, it is clear that it will be most difficult to keep both circuits closed at the same time. However in order to provide a combined score for the simultaneous closed circuit condition of both indicators, a third or combined score indicator 53 is provided. This indicator is identical in construction with the right-hand and left-hand indicators 49 and 50, and is electrically connected in parallel with the indicator 49 by the closing of a circuit through the normally open relay 54. The holding coil 54' of the relay is in parallel with the left-hand scoring indicator 50. Thus when the indicator 50 is energized the relay coil 54' will also be energized and the relay contactor will be pulled down to circuit closing position. If at the same time the indicator 49 is energized, then a circuit will also be completed through the relay contactor to the combined scoring indicator 53. In practice the score on indicator 53 will alway be less than that on either of the individual manually controlled indicators 49 or 50. As an example if the right-hand indicator 49 scores 60 after a complete cycle of the cam 29 and the left-hand indicator 50 scores 40 during the same time, then it might be found that the combined score indicator 53 will total 25. This smallest score on the combined indicator is due to the fact that the scoring circuits to the indicators 49 and 50 are not necessarily closed at the same time. In the present coordination testing apparatus the combined scoring is the most significant score, since it is obvious that a person under test might concentrate on achieving a high score with the right-hand scoring system for half the test and then concentrate on achieving a high score with the left-hand scoring system for the other half of the test, with the result that his aptitude would appear to be better than average. However his combined score under these circumstances might only be 5 or less and this would immediately reveal that the 50-50 scoring on indicators 49 and 50 was made at the expense of a reduced combined score.

The internal arrangement of the scoring devices 49, 50 and 53 may vary according to the synchronous motors available and gear ratios chosen but as stated above the pointer rotation should be at an angular velocity equal to that of the master cam 29. Speed regulation of synchronous motors is governed by well defined equations and as explained in U. S. Patent No. 1,936,837 granted to Robert Helmer on November 28, 1933 such motors can be built to operate at almost any desired speed, according to the frequency of the current and the number of poles. Once complete the synchronous motor will operate at only the calculated speed when supplied with alternating current of a frequency used in calculations. With a comparatively slow speed motor the armature, or rotating member, will start and stop almost instantly, as may be observed by starting and stopping the ordinary household electric clock which always includes a small synchronous motor. It might be noted also that the scoring devices 49, 50 and 53 may if desired be in the form of mechanical stop clocks actuated by magnetic means in the same manner as shown in Fig. 1 of U. S. Patent No. 2,023,488 granted to John R. Poppen on December 10, 1935.

The operation of the present testing apparatus is fairly obvious from the foregoing detailed description. However considering the action of the right-hand control system R, it is noted that the person being tested will manipulate knob 1 with the right hand while watching the pointer 39 having the letter R carried thereon. He will endeavor to maintain the pointer directly opposite to the fixed reference mark 41. The apparatus is started by manually closing power switch 35 to start the cam motor 30, and then switch 35 is released as soon as the high point or lobe 29' moves off the microswitch 34. The cam 29 will now continue to rotate one full revolution, at the end of which the cam lobe 29' will again contact the actuating element of microswitch 34 and break the circuit to the cam drive motor 30. The cam follower 15 will oscillate during rotary movement of the cam 29 and this movement will be imparted to the internal gear 14. Through the planet gears 13 and 13' this motion will be transmitted to the shaft 17, which will be turned in a sense opposite to that of internal gear 14 unless the operator neutralizes the effect by operation of knob 1. Thus if the operator turns the knob 1 in the same sense as the internal gear and at the same time, the shaft 17 will be held stationary. If this is done expertly by careful watching of the pointer 39 and manipulation of knob 1, the pointer may be held stationary and adjacent to fixed reference indicia 41. At the same time the switch arm 47 will be maintained in contact with contact element 51 to close the circuit to the score indicating device 49. The cam 29 is preferably driven by a synchronous motor 30 and the speeds of the motors driving the cam and also the pointer of indicator 49 are so selected that the cam and pointer will operate at equal angular velocities. Therefore if the operator has perfect coordinative ability the scoring pointer will complete one revolution in the time that the cam 29 completes one revolution and the score will be read directly from indicator 49 as 100. While the operator will of necessity have the coordination indicator 39 visible to him at all times, the scoring indicators 49, 50 and 53 will usually be visible only to the instructor or supervisor. The left-hand control system L is similar in every respect to the right-hand system and operates in the same manner. The combined cumulative scoring device 53 operates only when both contact arms 47 and 48 are in circuit closing positions, and like the scoring devices 49 and 50 operates by a synchronous motor in such manner that the pointer operates at the same angular velocity as the control cam 29. Thus the scores indicated on the devices 49, 50 and 53 are always comparable for any given test run. Because of the necessity of coordinating both manual controls 1 and 2 simultaneously, it is very much more difficult to maintain both right and left-hand control systems R and L stabilized at the same time than it is to maintain only a single system stabilized. With only a single system to stabilize an average operator might with a few trials achieve almost a perfect score, but with both systems to be stabilized simultaneously he would be exceptional if he could come close to a 50 reading on indicators 49 and 50 and also a 20 to 25 reading on combined score indicator 53. Thus the use of the two control systems simultaneously gives a far better indication of coordinative ability than would the use of only one system with only a single knob to operate and single pointer to watch. As described above, the contact arms 47 and 48 may be replaced by pairs of longer arms adapted to contact the contact elements farther from the center of rotation of the arms if a more difficult test of coordinative ability is desired. This will affect only the scores on indicators 49, 50 and 53 but will make it necessary to hold the pointers 39 and 40 close to the indicia 41 and 42 if a score is to be achieved on the cumulative scoring indicators 49, 50 and 53. Considering the right-hand control system R as an example, it should be noted that the system includes a differential mechanism 11 having one input means including a cam follower 15 and rigidly connected internal gear 14, another input means including a pulley member 9 driven by the manual control shaft 3 and one output means including a central shaft 17 extending from the differential mechanism axially thereof.

It is noted that the synchro generators 27 and 28 and the synchro receivers 37 and 38 are merely convenient motion reproducing devices, but the separate right and left hand synchro systems 27, 37 and 28, 38 must be supplied with a source of alternating current as shown in Fig. 1. These systems are sometimes termed powered selsyn systems, the term selsyn being a generic term signifying self-synchronous. For a more complete description of these components reference is made to a discussion entitled "Selsyn Design and Application" in Electrical Engineering for October 1945 by T. C. Johnson. Mechanical motion reproducing means such as gearing or a flexible shaft may if desired be substituted for the separate synchro or selsyn systems 27, 37 and 28, 38.

The present testing apparatus is useful for general testing of coordination of an individual, especially after the nature and object of the test is fully described to the individual. However the particular coordination indicator 36 chosen for illustration may also be considered analogous to the cross pointer indicator used on aircraft blind landing systems where a normally horizontal pointer indicates adherence in a vertical relation to a glide path beam and a normally vertical pointer indicates adherence in fore-and-aft heading to the glide path beam. Thus the ability of an aviation student to maintain the pointers 39 and 40 in the positions shown by manipulation of knobs 1 and 2 may indicate to some extent his inherent ability to expertly handle an aircraft during a blind landing operation, where aircraft guidance by the pilot must be achieved by maintaining the two pointers of the cross pointer indicator in the correct right angular relation.

The embodiments of the invention herein shown and described are to be regarded as illustrative only and it is to be understood that the invention is susceptible of variations, modifications and changes within the scope of the appended claim.

I claim:

A coordination testing apparatus comprising, a pair of similar differential mechanisms each including two input means and one output means, a rotatable cam for actuating one input means of each differential mechanism simultaneously in an irregular manner throughout a given cycle of operation of said cam, an indicating device including a pair of independently movable members each connected respectively to one of said output means, a pair of manually operable members each connected respectively to one of the other input means of said differential mechanisms for actuating said other input means independently, whereby to neutralize according to the degree of coordination of the operator the movement of said pair of movable members imparted thereto by said cam, a pair of movable means each connected respectively to one of said output means and each adapted to close a separate score indicating circuit only when said movable means are maintained in or near predetermined positions, a pair of score indicating means operable at a steady rate upon closing of the respective score indicating circuits to indicate cumulative scores of said degree of coordination during said given cycle of operation of said cam, a combined score indicating circuit including means responsive to closing of said pair of score indicating circuits simultaneously to close said combined score indicating circuit, and a third score indicating means operable at a steady rate upon closing of said combined score indicating circuit to indicate the degree of coordination of the operator in maintaining said pair of movable means in or near said predetermined positions simultaneously.

WALTER F. GRETHER.

REFERENCES CITED

The following references are of record in the file of this patent:

UNITED STATES PATENTS

| Number | Name | Date |
|---|---|---|
| 1,655,244 | Rowell | Jan. 3, 1928 |
| 1,953,954 | Constable | Apr. 10, 1934 |
| 1,985,265 | Smith | Dec. 25, 1934 |
| 2,023,488 | Poppen | Dec. 10, 1935 |
| 2,066,949 | Ruiz | Jan. 5, 1937 |
| 2,148,828 | Myers | Feb. 28, 1939 |
| 2,305,207 | Tigerman | Dec. 15, 1942 |
| 2,308,566 | Noxon | Jan. 19, 1943 |
| 2,336,711 | Barber | Dec. 14, 1943 |
| 2,341,678 | Wickes | Feb. 15, 1944 |
| 2,409,238 | Barber | Oct. 15, 1946 |
| 2,445,673 | Kail | July 20, 1948 |